US012774976B2

(12) United States Patent
Hilleringmann et al.

(10) Patent No.: US 12,774,976 B2
(45) Date of Patent: Oct. 27, 2026

(54) HUMIDITY SENSOR

(71) Applicant: Universitaet Paderborn, Paderborn (DE)

(72) Inventors: Ulrich Hilleringmann, Bad Wuennenberg (DE); Dmitry Petrov, Paderborn (DE)

(73) Assignee: Universitaet Paderborn, Paderborn (DE)

( * ) Notice: Subject to any disclaimer, the term of this patent is extended or adjusted under 35 U.S.C. 154(b) by 124 days.

(21) Appl. No.: 18/878,516

(22) PCT Filed: Jun. 21, 2023

(86) PCT No.: PCT/EP2023/066788
§ 371 (c)(1),
(2) Date: Dec. 23, 2024

(87) PCT Pub. No.: WO2023/247621
PCT Pub. Date: Dec. 28, 2023

(65) Prior Publication Data

US 2025/0377324 A1 Dec. 11, 2025

(30) Foreign Application Priority Data

Jun. 24, 2022 (DE) ..................... 10 2022 115 747.4

(51) Int. Cl.
*G01N 27/12* (2006.01)
*G08B 21/20* (2006.01)

(52) U.S. Cl.
CPC ........... *G01N 27/121* (2013.01); *G08B 21/20* (2013.01)

(58) Field of Classification Search
CPC .... G01N 27/025; G01N 27/04; G01N 27/048; G01N 27/121; G01N 27/223; G08B 21/20
See application file for complete search history.

(56) References Cited

U.S. PATENT DOCUMENTS 10,466,137 B1 11/2019 Billman et al.
2021/0317665 A1* 10/2021 Hilleringmann ........ B32B 27/08

FOREIGN PATENT DOCUMENTS

| | | | |
|---|---|---|---|
| CN | 210427430 | U | 4/2020 |
| DE | 102018006950 | A1 | 3/2020 |
| WO | 2008052811 | A1 | 5/2008 |

OTHER PUBLICATIONS

International Search Report mailed on Oct. 18, 2023, in International Application No. PCT/EP2023/066788.

(Continued)

*Primary Examiner* — Steven L Yeninas
(74) *Attorney, Agent, or Firm* — Patent Central LLC; Stephan A. Pendorf

(57) ABSTRACT

A humidity sensor which may be tested after installation including: a first electrode having a first surface material; a second electrode having a second surface material that is different from the first surface material such that an electrical voltage is generated when the first surface material and the second surface material come into contact with a humid medium; a voltage-increasing device; an energy storage device for storing the electrical energy provided by the two electrodes; and a transmitter unit for wirelessly transmitting information, wherein one of the electrodes is shaped as a coil which is electrically connected to a capacitor in order to form a resonant circuit so that, in a test state of the humidity sensor, the resonant circuit can be excited by an external high-frequency signal in order to generate the electrical supply energy for the control device in order to provide a test signal.

12 Claims, 1 Drawing Sheet

(56) References Cited

OTHER PUBLICATIONS

Figure 1:
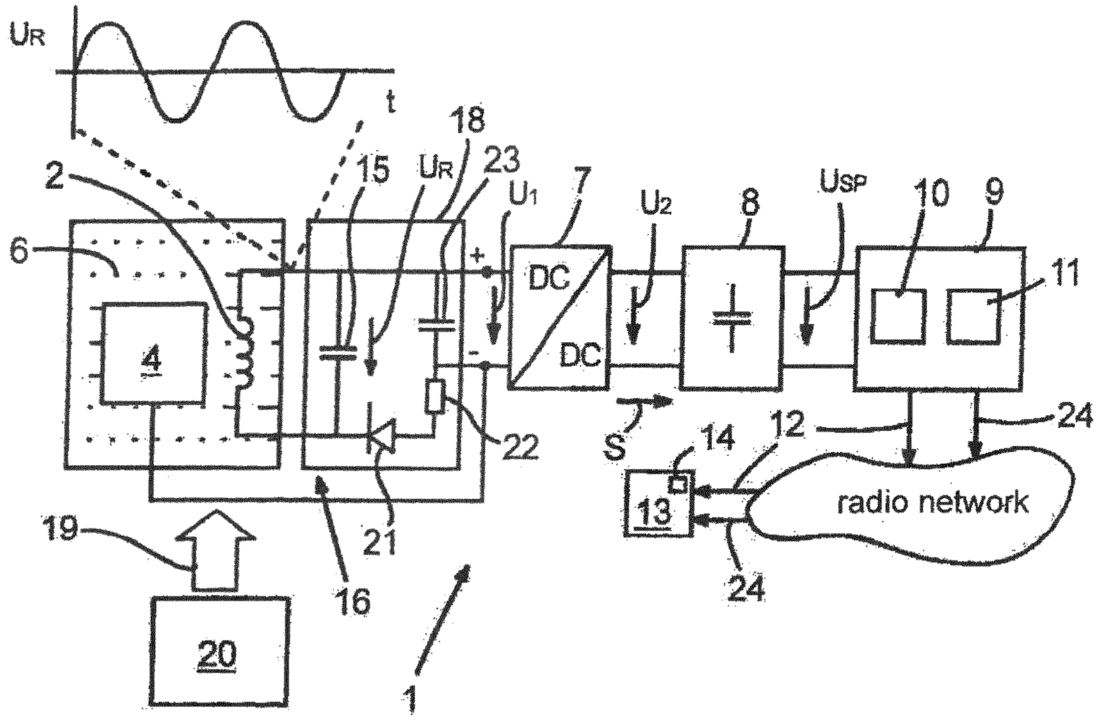

Petrov, Dmitry, et al.: "Water-based primary cell for powering of wireless sensors", 2020 IEEE Sensors, Oct. 25, 2020 (Oct. 25, 2020), pp. 1-4, http://dx.doi.org/10.1109/SENSORS47125.2020.9278891, ISBN 978-1-7281-6801-2, XP093089535.
Fernandez-Salmeron, Jose, et. al.: "HF RFID Tag as Humidity Sensor: Two Different Approaches", IEEE Sensors Journal, USA, vol. 15, No. 10, Aug. 14, 2015 (Aug. 14, 2015), pp. 5726-5733, http://dx.doi.org/10.1109/JSEN.2015.2447031, ISSN 1530-437X, XP011666531.
Nishimura, F., et. al.: "Alive Monitoring Sensor System with 2.45-GHz Wireless Power Transfer for Self-powered Wireless Sensor", 2021 IEEE Sensors, IEEE, 2021, pp. 1-4.
Office Action of Mar. 3, 2023, issued in corresponding German Application No. 10 2022 115 747.4.
International Preliminary Report on Patentability mailed on Dec. 18, 2024, in International Application No. PCT/EP2023/066788.

* cited by examiner

HUMIDITY SENSOR

The invention relates to a humidity sensor comprising a first electrode having a first surface material and comprising a second electrode having a second surface material that is different from the first surface material such that an electrical voltage is generated when the first surface material and the second surface material come into contact with a humid medium, comprising a voltage-increasing device for increasing the electrical voltage, comprising an energy-storage device for storing electrical energy provided by at least one of the two electrodes, and comprising a transmitter unit for wirelessly transmitting information.

DE 10 2018 006 950 A1 discloses a humidity sensor comprising a first electrode and a second electrode, which comprise different metal surface materials such that an electrical voltage, which is applied to an energy-storage device for storing electrical energy, is generated when they come into contact with humidity or a liquid. The energy-storage device comprises an electrical capacitor, which, after charging, supplies a voltage-increasing device, which increases the electrical voltage to such an extent that a supply voltage can be transmitted to an evaluation device for the operation of a transmitter device for wirelessly transmitting information, for example location data or identification data. A drawback of this known humidity sensor is that the potential difference between the two electrodes has to be relatively large in order to charge the energy-storage device. In addition, the energy-storage device has to comprise a capacitor having a relatively high capacitance in order to provide the required operating energy for the energy-storage device. Furthermore, the humidity sensor may not be tested after installation.

The problem addressed by the present invention is therefore to develop a humidity sensor such that the efficiency and in particular the operational safety is increased in a simple manner.

To solve this problem, in conjunction with the preamble of claim 1, the invention is characterized in that the energy-storage device is arranged downstream of the voltage-increasing device in the signal direction such that, in a sensor state of the humidity sensor, an electrical supply energy for a control device for providing a sensor signal is applied to an output of the energy-storage device, in that one of the electrodes is shaped to be a coil, which is electrically connected to a capacitor in order to form a resonant circuit such that, in a test state of the humidity sensor, the resonant circuit can be excited by an external high-frequency signal in order to generate the electrical supply energy for the control device in order to provide a test signal.

According to the invention, an energy-storage device is arranged in front of a voltage-increasing device in the signal direction. This means that, during operation of the humidity sensor in a humid environment around it (sensor state), the potential difference applied to the two electrodes is increased by means of the voltage-increasing device to a voltage level such that the downstream energy-storage device can be charged with an increased electrical voltage. Owing to the increased voltage applied to the energy-storage device, electrical supply energy for a downstream control device can be obtained more rapidly or with a lower capacitance by using the energy-storage device. The invention also makes it possible for the humidity sensor to be located or identified not only in a humid environment (sensor state), but also in a non-humid environment (test state). For this purpose, one of the electrodes is configured to be shaped to be an electrical coil (inductor) which is connected to an electrical capacitor in order to form a resonant circuit. The resonant circuit can be excited by means of an external high-frequency signal, such that electrical energy is provided to electrically supply the control device. The control device generates a test signal for locating the humidity sensor or for testing the humidity sensor without the humidity sensor having to be arranged in a humid environment. Therefore, a functional test of the humidity sensor can be performed in any state of the humidity sensor, whether or not it is in a humid environment.

According to a preferred embodiment of the invention, the voltage-increasing device has power point control. As a result, the charging of the energy-storage device is always in an impedance-matching mode. Advantageously, this can reduce the charging time, or smaller electrodes can be used with the same charging time.

According to a development of the invention, the voltage-increasing device is configured such that a voltage increase at an output of the voltage-increasing device to a minimum voltage value of 3 V is present. A relatively high voltage is applied to the input of the energy-storage device, such that the capacitor of the energy-storage device can be designed to be smaller for the same charging capacity. This can advantageously reduce costs.

According to a development of the invention, the voltage-increasing device is configured such that a voltage increase takes place at a minimum input voltage of 200 mV, in particular 300 mV, preferably 350 mV. The voltage-increasing device is preferably configured as a charge pump having power point control. Advantageously, the electrodes only need a comparatively low potential difference. This ensures a more rapid response of the humidity sensor and a larger measuring range.

According to a development of the invention, the resonant circuit is connected to a charging device for providing the electrical input voltage for the voltage-increasing circuit from a resonant signal of the resonant circuit. Preferably, the charging device comprises a charging capacitor, which is gradually charged to the extent that it provides the electrical supply voltage for the voltage-increasing device. The charging device is arranged between the resonant circuit and the voltage-increasing device. To send the test signal, the available components of the humidity sensor can be used in the sensor state, namely the voltage-increasing device, the energy-storage device, and the control device.

According to a development of the invention, the electrode constructed as a coil is configured in a spiral shape and is arranged on a planar carrier. The spiral-shaped coil surrounds or frames the other electrode, which is likewise arranged on the carrier in a planar manner. Advantageously, the spiral-shaped electrode acts as an RFID antenna, which is tuned to the preferably high-frequency electromagnetic external alternating field such that the resonant signal is generated together with the capacitor of the resonant circuit, the resonant frequency alone being dependent on the inductance of the coil and the capacitance of the capacitor. The coil of the resonant circuit is used both for supplying the resonant circuit with electrical energy and as part of the resonant circuit for providing the resonant signal.

According to a development of the invention, the control device comprises a microcontroller and a transmitter unit. The microcontroller comprises information data for the humidity sensor, for example an identifier thereof, in a memory. The transmitter device can for example comprise a radio antenna, by means of which the test signal or sensor signal is transmitted to an external evaluation device.

Figure 2:
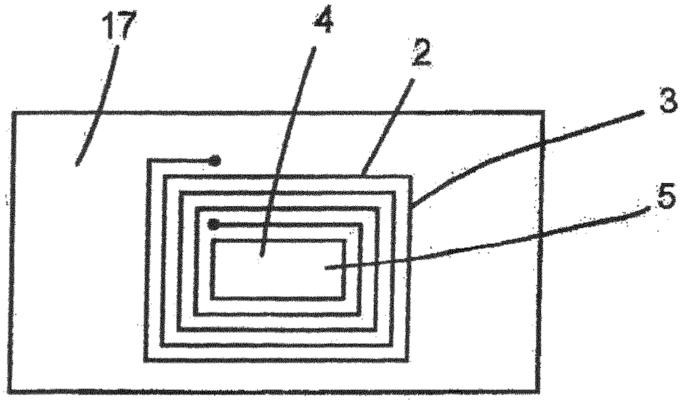

An exemplary embodiment of the invention will be described below in more detail with reference to the drawings, in which:

FIG. 1 is a circuit diagram of a humidity sensor according to the invention and FIG. 2 is a plan view of a first electrode and a second electrode of the humidity sensor.

A humidity sensor 1 can be used to detect humidity. To do this, the humidity sensor has to be located in a humid medium. It is then in a sensor state. If the humidity sensor 1 is located in a dry medium, it is in a non-sensor state or test state, as explained further below.

The humidity sensor 1 comprises a first electrode 2 having a first surface material 3 and a second electrode 4 having a second surface material 5. The first surface material 3 and the second surface material 5 consist of different materials, preferably different metal materials. For example, the first surface material 3 can consist of a gold or copper or nickel material. For example, the second surface material 5 can consist of a zinc material. If the humidity sensor 1 is in a sensor state, i.e. the first electrode 2 and the second electrode 4 are in a humid medium 6, for example a liquid, an electrical tap voltage, which acts as an electrical input voltage $U_1$ for a voltage-increasing device 7, can be tapped at terminals of the first electrode 2 and the second electrode 4.

The voltage-increasing device 7 is preferably configured as a charge pump, which, in the manner of a DC-to-DC voltage converter, provides an increase voltage $U_2$ (output voltage) on the output side from the tap voltage $U_1$ (input voltage). The charge pump 7 can preferably comprise a plurality of capacitors and diodes.

An energy-storage device 8 is arranged downstream of the voltage-increasing device 7 in the signal direction S. The output signal $U_2$ of the voltage-increasing device 7 forms an input signal of the energy-storage device 8. The energy-storage device 8 is used to charge electrical energy which is sufficient to supply a control device 9 arranged downstream in the signal direction S. In the present exemplary embodiment, the energy-storage device 8 comprises a capacitor, which is charged to a supply voltage $U_{SP}$. The supply voltage $U_{SP}$ can have a minimum voltage value of 3 V, for example.

Preferably, the charge pump 7 has power point control, such that the voltage-increasing device 7 for charging the energy-storage device 8 is always in an impedance-matching mode. As a result, the charging time of the capacitor of the energy-storage device 8 can be decreased or the charging time can be reduced.

The voltage increase of the voltage-increasing device 7 is so great that, for providing the increase voltage $U_2$ at the output of approx. 3 V, the tap voltage $U_1$ and thus the input voltage $U_1$ of the voltage-increasing device 7 can have a minimum voltage value of 100 mV, in particular 200 mV or 300 mV, preferably at least 350 mV. Advantageously, the first electrode 2 and/or the second electrode 4 each only need to have a small amount of potential in the sensor state.

The control device 9 comprises a microcontroller 10 and a transmitter unit 11, by means of which, in the sensor state of the humidity sensor 1, a sensor signal 12 can be wirelessly transmitted to an external evaluation device 13. For this purpose, the evaluation device 13 comprises a receiving unit 14. The identifier of the humidity sensor 1 is transmitted as the sensor signal 12, for example. There are means for identifying the humidity sensor 1 from the sensor signal 12 in the evaluation device 13, such that the humidity sensor 1 can be identified as a humidity-detecting humidity sensor 1. For example, the humidity sensor 1 can act as a leak sensor for identifying a leak, for example in a pipeline. Humidity detection takes place when a minimum voltage value of 200 mV is applied to the two electrodes 2 and 4 and a current of for example 100 μA is flowing, which is sufficient for actuating the voltage-increasing device 7. The voltage-increasing device 7 can for example charge a 200 μF capacitor of the energy-storage device 8 in a time between one and five minutes, such that the microcontroller 10 of the control device 9 can then be started in order to generate the sensor signal 12 containing the identifier of the humidity sensor 1.

The sensor signal 12 is transmitted wirelessly via radio from the transmitter unit 11 to a receiving unit 14 of the external evaluation device 13.

So that the humidity sensor 1 can be located or tested in a non-humid state or test state of the humidity sensor 1, one of the electrodes, the first electrode 2 in this exemplary embodiment, is configured as a coil. A capacitor 15 is connected in parallel with the coil 2, such that the coil 2 and the capacitor 15 form a parallel resonant circuit 16.

As shown in FIG. 2, the first electrode 2 is configured in a spiral shape, and is arranged on a carrier 17 in a planar manner. The second electrode 4 is arranged in the center or interior of the coil 2 in a planar manner on the same carrier 17 as is configured as the electrode carrier. The second electrode 2 can be configured to be rectangular, as shown in FIG. 2, or oval or circular.

In the present exemplary embodiment, the first electrode 2 has a first surface material 3 made of a gold material. The second electrode 4 has a zinc material as a second surface material 5.

The electrode carrier 17 can consist of a rigid or flexible plastics material.

The spiral-shaped coil electrode 2 thus surrounds the second electrode 4, with both electrodes 2, 4 extending in a shared plane.

The resonant circuit 16 is connected to a charging device 18 for providing the input voltage $U_1$ to the voltage-increasing device 7. Output terminals of the charging device 18 form input terminals of the voltage-increasing device 7. In the test state or non-humid state of the humidity sensor 1, the potential at the first electrode 2 and the second electrode 4 is zero, such that the terminal of the second electrode 4 (zinc electrode) at the minus input terminal of the voltage-increasing device 7 does not have an influence on the input voltage $U_1$. The input voltage $U_1$ of the voltage-increasing device 7 is brought about solely by exciting the resonant circuit 16. For this purpose, the electrode coil 2 acts as an RFID antenna, which is supplied by an external high-frequency signal 19 from a high-frequency source 20. The high-frequency source 20 is configured such that, as a high-frequency signal 19, a high-frequency electromagnetic alternating field is generated, to which the electrode coil 2 is exposed.

The resonant circuit 16 is connected to a charging device 18 for providing the input voltage $U_1$ to the voltage-increasing device 7. In the present exemplary embodiment, the charging device 18 comprises a diode 21, a resistor 22, and a charging capacitor 23, which is connected to the input terminals of the voltage-increasing device 7.

The resonant signal (voltage signal UR) applied to the capacitor 15 of the resonant circuit 16 is charged by means of the charging device 18 to 200 mV, which is available as an input voltage $U_1$ for the voltage-increasing circuit 7.

If the capacitor 15 of the resonant circuit 16 has a capacitance of 100 nF, for example, the charging capacitor 23 has a capacitance of 50 μF. The resistor 22 can have a value of 10 kΩ. The diode 21 is connected between a terminal of the charging capacitor 23 and the capacitor 15 such that the charging capacitor 23 is charged in one direction, for example to 200 mV. The thus formed input voltage $U_1$ at the input of the voltage-increasing device 7 is sufficient to activate the voltage-increasing device 7, such that, after subsequently charging the energy-storage device 8, the microcontroller 10 of the control device 9 can be activated in order to transmit the identifier of the humidity sensor 1 from the transmitter unit 11 of the control device 9 to the receiving unit 14 of the evaluation device 13 via the radio interface in the form of a test signal 24. Therefore, the humidity sensor 1 can also be located or tested in the non-humid state or test state of the humidity sensor 1.

The electrode coil 2 can have a number of turns in the range between two and 50 turns. When the electrode coil 2 has 10 turns, for example, the resonant frequency is 200 kHz in the present exemplary embodiment. This is dependent on the desired resonant frequency. The sensor signal 12 and test signal 24 emitted by the transmitter unit 11 can be in an MHz range, for example in the range of 868 MHz.

The humidity sensor 1 is in the sensor state when the electrodes 2, 4 are in a liquid, for example water. It is also in the sensor state when the two electrodes 2, 4 are in contact with a humidity-binding medium, such as a humidity-sensitive non-woven fabric (non-woven fabric having an LiCl coating or another hygroscopic coating).

The invention claimed is:

1. A humidity sensor comprising a first electrode (2) having a first surface material (3) and comprising a second electrode (4) having a second surface material (5) that is different from the first surface material (3) such that an electrical voltage ($U_1$) is generated when the first surface material (3) and the second surface material (5) come into contact with a humid medium (6), comprising a voltage-increasing device (7) for increasing the electrical voltage ($U_1$), comprising an energy-storage device (8) for storing electrical energy provided by at least one of the two electrodes (2, 4), and comprising a transmitter unit (11) for wirelessly transmitting information, wherein the energy-storage device (8) is arranged downstream of the voltage-increasing device (7) in the signal direction (S) such that, in a sensor state of the humidity sensor (1), an electrical supply energy ($U_{SP}$) for a control device (9) for providing a sensor signal (12) is applied to an output of the energy-storage device (8), and one of the electrodes (2, 4) is a coil, which is electrically connected to a capacitor (15) in order to form a resonant circuit (16) such that, in a test state of the humidity sensor (1), the resonant circuit (16) can be excited by an external high-frequency signal (19) in order to generate the electrical supply energy ($U_{SP}$) for the control device (9) in order to provide a test signal (24).

2. The humidity sensor according to claim 1, wherein the voltage-increasing device (7) has power point control, such that the voltage-increasing device (7) is in an impedance-matching mode.

3. The humidity sensor according to claim 1, wherein the voltage-increasing device (7) is configured such that a minimum voltage value of 3 V is present at an output of the voltage-increasing device (7).

4. The humidity sensor according to claim 1, wherein the voltage-increasing device (7) is configured such that the voltage increase takes place at a minimum input voltage at the input of the voltage-increasing device (7) of 100 mV.

5. The humidity sensor according to claim 1, wherein the resonant circuit (16) is connected to a charging device (18) for providing the input voltage ($U_1$) to the voltage-increasing device (7) from a resonant signal (UR) of the resonant circuit (16).

6. The humidity sensor according to claim 5, wherein the charging device (18) comprises a charging capacitor (23), which abuts the input of the voltage-increasing device (7) and has a higher capacitance than the capacitor (15) of the resonant circuit (16).

7. The humidity sensor according to claim 1, wherein the resonant circuit (16) is a parallel resonant circuit (16).

8. The humidity sensor according to claim 1, wherein the one electrode (2), constructed as a coil, of the resonant circuit (16) is arranged in a spiral shape on a carrier (17) so as to be guided around the other electrode (4).

9. The humidity sensor according to claim 1, wherein the electrode (2) constructed as a coil has a number of turns in a range from 2 to 50 turns.

10. The humidity sensor according to claim 1, wherein the control device (9) comprises a microcontroller (10) and the transmitter unit (11) for wirelessly transmitting at least one of the sensor signal (12) and the test signal (24) to an external evaluation device (13).

11. The humidity sensor according to claim 1, wherein the voltage-increasing device (7) is configured such that the voltage increase takes place at a minimum input voltage at the input of the voltage-increasing device (7) of 300 mV.

12. The humidity sensor according to claim 1, wherein the voltage-increasing device (7) is configured such that the voltage increase takes place at a minimum input voltage at the input of the voltage-increasing device (7) of at least 350 mV.

* * * * *